(12) United States Patent
Madden

(10) Patent No.: US 11,356,271 B2
(45) Date of Patent: Jun. 7, 2022

(54) SYSTEMS AND METHODS FOR PROVIDING A TRUSTED KEYSTORE

(71) Applicant: VeriFone, Inc., San Jose, CA (US)

(72) Inventor: Chris Madden, Dublin (IE)

(73) Assignee: VERIFONE, INC., Wilmington, DE (US)

( * ) Notice: Subject to any disclaimer, the term of this patent is extended or adjusted under 35 U.S.C. 154(b) by 188 days.

(21) Appl. No.: 16/790,564

(22) Filed: Feb. 13, 2020

(65) Prior Publication Data

US 2021/0258167 A1 Aug. 19, 2021

(51) Int. Cl.
*H04L 9/32* (2006.01)
*H04L 9/06* (2006.01)
*H04L 9/08* (2006.01)

(52) U.S. Cl.
CPC .......... *H04L 9/3242* (2013.01); *H04L 9/0643* (2013.01); *H04L 9/083* (2013.01); *H04L 9/0894* (2013.01); *H04L 9/3226* (2013.01)

(58) Field of Classification Search
CPC ..... H04L 9/3242; H04L 9/0643; H04L 9/083; H04L 9/0894; H04L 9/3226
See application file for complete search history.

(56) References Cited

U.S. PATENT DOCUMENTS

| | | | | |
|---|---|---|---|---|
| 8,166,314 | B1* | 4/2012 | Raizen | G06F 21/78 713/193 |
| 10,063,372 | B1* | 8/2018 | Chiu | H04L 9/083 |
| 2012/0131344 | A1* | 5/2012 | Bellwood | H04L 63/126 713/176 |
| 2015/0288664 | A1* | 10/2015 | Murray | H04L 9/14 713/165 |
| 2016/0248809 | A1* | 8/2016 | Smith | H04L 63/20 |
| 2018/0211049 | A1* | 7/2018 | Kelso | H04L 9/0897 |
| 2018/0240111 | A1* | 8/2018 | Smets | G06Q 20/102 |

(Continued)

FOREIGN PATENT DOCUMENTS

CN 112469036 A 3/2021

OTHER PUBLICATIONS

International Search Report and the Written Opinion of the International Searching Authority, International Patent Application No. PCT/US2021/016909 pp. 1-6 dated Apr. 29, 2021.

*Primary Examiner* — J. Brant Murphy
(74) *Attorney, Agent, or Firm* — Bond, Schoeneck & King, PLLC

(57) ABSTRACT

Systems and methods for providing a trusted keystore are disclosed. In one embodiment, in an information processing apparatus comprising at least one computer processor, a method for providing a trusted keystore may include: (1) selecting and storing a root Keyblock Protection Key (KBPK) in a trusted domain; (2) for each key class: creating a keyblock with a class KBPK; and storing the keyblock in an untrusted keystore in an unfrosted domain; (3) loading keyblocks to a trusted key manager in the trusted domain; (4) decrypting the keyblocks with an encryption class key; (5) verifying the keyblocks under a MAC class key; (6) loading class keyblocks to the trusted key manager from the untrusted keystore; (7) writing the keyblocks to the untrusted keystore; and (8) writing class keyblock MACs in a hierarchy to the untrusted keystore. A number of levels in the hierarchy is based on an amount of available storage in the trusted domain.

20 Claims, 6 Drawing Sheets

(56) References Cited

U.S. PATENT DOCUMENTS

| | | | | |
|---|---|---|---|---|
| 2018/0240113 A1* | 8/2018 | Smets | .................... | G06Q 20/32 |
| 2019/0044729 A1* | 2/2019 | Chhabra | ............. | G06F 12/1408 |
| 2019/0158536 A1* | 5/2019 | Kraemer | ............... | H04L 63/168 |
| 2019/0312718 A1* | 10/2019 | Michiels | ................. | G06F 21/75 |
| 2020/0076580 A1* | 3/2020 | Driever | ................... | H04L 9/083 |
| 2020/0076595 A1* | 3/2020 | Hathorn | ................ | H04L 9/3263 |
| 2020/0076600 A1* | 3/2020 | Driever | ............... | H04L 63/0435 |
| 2020/0076807 A1* | 3/2020 | Driever | ................ | H04L 9/3273 |

* cited by examiner

| KeyBlockHeader (205) | Key (210) | MAC (215) |
|---|---|---|

FIGURE 2

SYSTEMS AND METHODS FOR PROVIDING A TRUSTED KEYSTORE

BACKGROUND OF THE INVENTION

1. Field of the Invention

The present disclosure relates generally to systems and methods for providing a trusted keystore.

2. Description of The Related Art

Electronic transaction devices, such as point of sale devices, often have limited secure storage for storing things like encryption keys. As the number of keys that are managed grows, the amount of secure storage that may be used for other purposes may be reduced.

SUMMARY OF THE INVENTION

Systems and methods for providing a trusted keystore are disclosed. In one embodiment, in an information processing apparatus comprising at least one computer processor, a method for providing a trusted keystore may include: (1) selecting and storing a root Keyblock Protection Key (KBPK) in a trusted domain; (2) for each key class: creating a keyblock with a class KBPK; and storing the keyblock in an untrusted keystore in an untrusted domain; (3) loading keyblocks to a trusted key manager in the trusted domain; (4) decrypting the keyblocks with an encryption class key; (5) verifying the keyblocks under a MAC class key; (6) loading class keyblocks to the trusted key manager from the untrusted keystore; (7) writing the keyblocks to the untrusted keystore; and (8) writing class keyblock MACs in a hierarchy to the untrusted keystore. A number of levels in the hierarchy is based on an amount of available storage in the trusted domain.

In one embodiment, the root KBPK may be pre-programed.

In one embodiment, the keyblock may be created using the root KBPK.

In one embodiment, the step of loading class keyblocks to the trusted key manager from the untrusted keystore may include authorizing and decrypting the class keyblocks with the root KBPK to get a class KBPK and a keyblockheader.

In one embodiment, the step of writing the keyblocks to the untrusted keystore may include creating the keyblock with a key, a keyblockheader payload, and a keyblock KBPK.

In one embodiment, the step of hierarchically writing class keyblock MACs to the untrusted keystore may include creating a MAC for all keyblocks in a keyblock class.

In one embodiment, the method may further include verifying all the keyblocks under the MAC class key after hierarchically writing class keyblock MACs to the untrusted keystore.

According to another embodiment, in a trusted key manager comprising at least one computer processor, a method for exercising a key in a trusted keystore may include: (1) receiving a request from an application to exercise a key in an untrusted keystore; (2) reading a keyblock including the key from the untrusted keystore; (3) decrypting and verifying keyblocks in a hierarchy that are below the read keyblock; (4) loading a class Keyblock Protection Key (KBPK) MAC; (5) verifying the class KBPK MAC; (6) trusting the class KeyBlocks MAC; (7) extracting the key from the keyblock; and (8) loading the key to an engine. The engine may exercise the key.

In one embodiment, the exercise may include at least one of PIN encryption using the key and message authentication using the key.

In one embodiment, the method may further include verifying that the application is authorized to exercise the key.

In one embodiment, the engine may perform a cryptographic operation with the key.

According to another embodiment, a trusted keystore system may include: an untrusted domain comprising an untrusted keystore and an untrusted key manager; a trusted domain comprising a trusted key manager and an engine; and persistent storage. The trusted key manager may select and store a root Keyblock Protection Key (KBPK) in the trusted domain. For each key class, the trusted key manager may create a keyblock with a class KBPK and store the keyblock in the untrusted keystore. The untrusted key manager may load keyblocks to a trusted key manager in the trusted domain, and the trusted key manager may decrypt and verify keyblocks under a MAC class key. The untrusted key manager may load class keyblocks to the trusted key manager from the untrusted keystore, may write the keyblocks to the untrusted keystore via the untrusted key manager, and may write class keyblock MACs in a hierarchy to the untrusted keystore via the untrusted key manager. A number of levels in the hierarchy is based on an amount of available storage in the trusted domain.

In one embodiment, the root KBPK may be pre-programed in a system-on-a-chip.

In one embodiment, the keyblock may be created using the root KBPK.

In one embodiment, the trusted key manager may authorize and decrypt the class keyblocks with the root KBPK to get a class KBPK and a keyblockheader.

In one embodiment, the keyblock may be created with a key, a keyblockheader payload, and a keyblock KBPK.

In one embodiment, the untrusted key store may create a MAC for all keyblocks in a keyblock class.

In one embodiment, the trusted key manager receives a request from an application to exercise a key in the untrusted keystore, may read a keyblock including the key from the untrusted keystore via the untrusted key manager, may decrypt and verify keyblocks in a hierarchy that are below the read keyblock, may load a class Keyblock Protection Key (KBPK) MAC, may verify the class KBPK MAC; may extract the key from the keyblock, and may load the key to an engine. The engine may exercise the key.

In one embodiment, the exercise may include at least one of PIN encryption using the key and message authentication using the key.

In one embodiment, the engine may perform a cryptographic operation with the key.

BRIEF DESCRIPTION OF THE DRAWINGS

For a more complete understanding of the present invention, the objects and advantages thereof, reference is now made to the following descriptions taken in connection with the accompanying drawings in which:

FIG. 2 depicts an exemplary keyblock according to one embodiment;

DETAILED DESCRIPTION OF PREFERRED EMBODIMENTS

Embodiments are directed to systems and methods for providing a trusted keystore.

In embodiments, using a keystore in an untrusted environment or domain may reduce space required in the trusted environment or domain, may be scalable (e.g., an unbound number of keys can be stored in the key store), may reduce bill of materials cost, may provide robust storage, may facilitate wiping a device while preserving any key content, which may reduce deployment/repair costs, may provide security including replay prevention without requiring monotonic increasing values, such as time, counter, etc., may provide full keystore and individual keyblock security, etc. The keystore may further be optimizable for speed or performance.

Embodiments may use a message authentication code, or MAC, and an encryption tree to minimize storage space used in the trusted domain, minimize computation effort and/or time in the trusted domain. Embodiments may ensure that the keystore provides replay protection and protection from addition or removal of a keyblock.

In one embodiment, the secure storage may be configured considering the desired key access speed and an amount of available storage in the trusted domain. For example, if there is more secure storage available, more layers in the hierarchy may be used on the secure side. Thus, less time is required to processing/unwrapping to access the desired key from the untrusted side.

Figure 1:
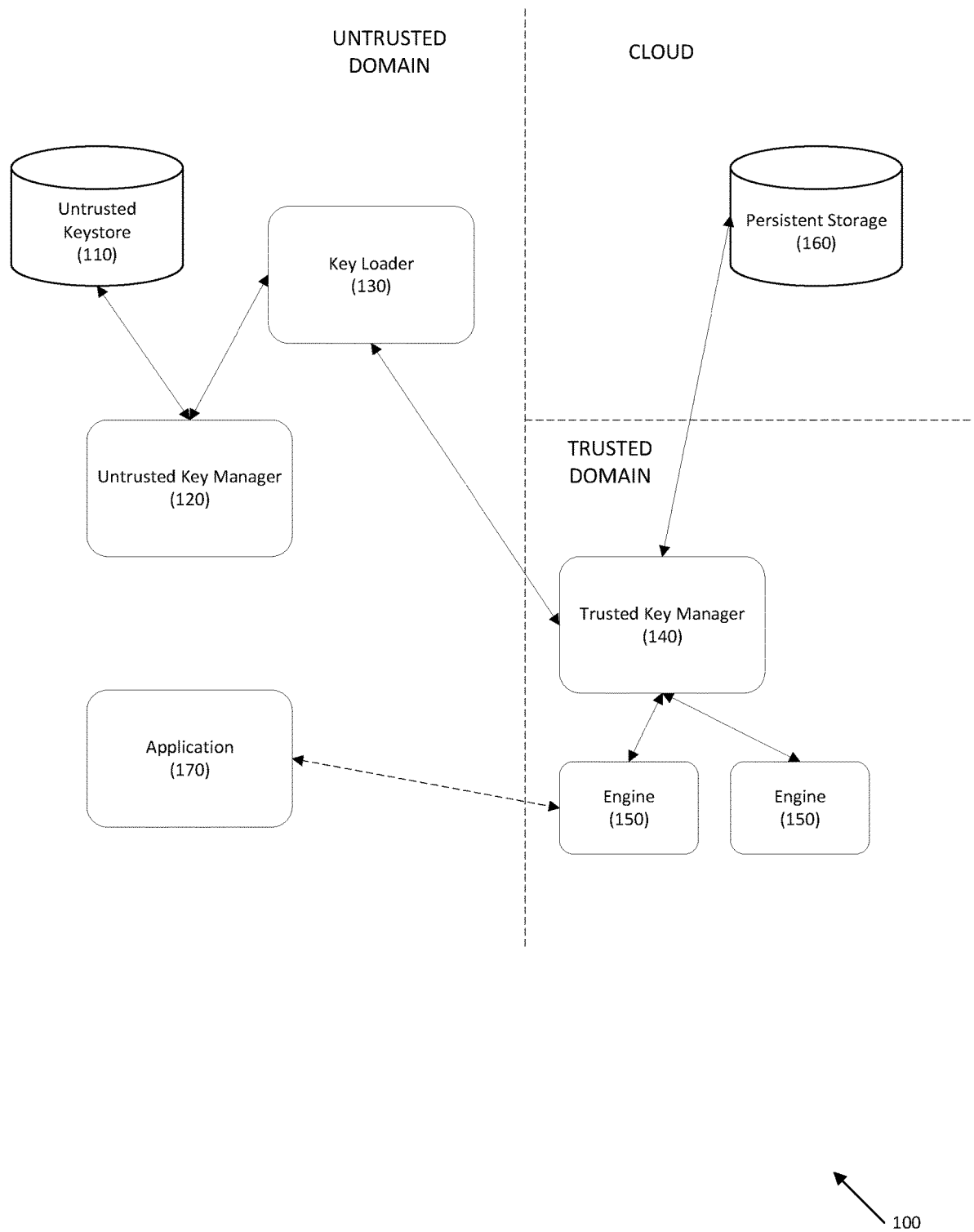
FIG. 1 depicts a system for providing a trusted keystore according to one embodiment.

Referring to FIG. 1, a system for providing a trusted keystore is disclosed according to one embodiment. System 100 may include a trusted domain, an untrusted domain, and cloud storage (which may be in the untrusted domain). The untrusted domain may include untrusted keystore 110, untrusted key manger 120, and key loader 130. The trusted domain may include trusted key manger 140 and one or more engine 150. Persistent storage 160 may be stored in the cloud, or in any suitable storage. In one embodiment, persistent storage may be encrypted.

Application 170 may be provided in the untrusted domain. In one embodiment, application 170 may be a consumer of a key.

The trusted domain may be any environment that includes software and/or hardware that support an area of sufficient security to protect keys in plaintext (i.e., unencrypted), and may exercise the keys with the required algorithm.

The untrusted domain may include general purpose software that may exercise or use the keys.

In one embodiment, the untrusted domain and the trusted domain may exist in an electronic device, such as a point of sale device.

Figure 2:
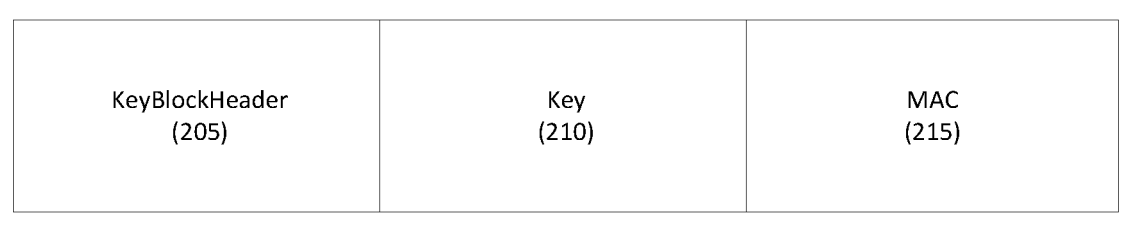

In one embodiment, untrusted keystore 110 may store keys in "keyblocks." For example, referring to FIG. 2, each keyblock 200 may include header (KBH) 205, key 210, and MAC 215, which may be based on a keyblock protection key (KBPK).

The KBPK may derive two keys to protect keyblock 200: an encryption key and a MAC. The KBPKs may be arranged in a hierarchy, with a root KBPK having one or more class KBPKs, and each class KBPK having one or more Keyblock KBPKs. An example hierarchy is illustrated in FIG. 3.

In one embodiment, from the root KBPK, all other KBPKs may be determined from the encrypted KBPKs. The root KBPK may be used to recover the class KBPKs, which may be used to recover the KeyBlock KBPKs.

Figure 3:
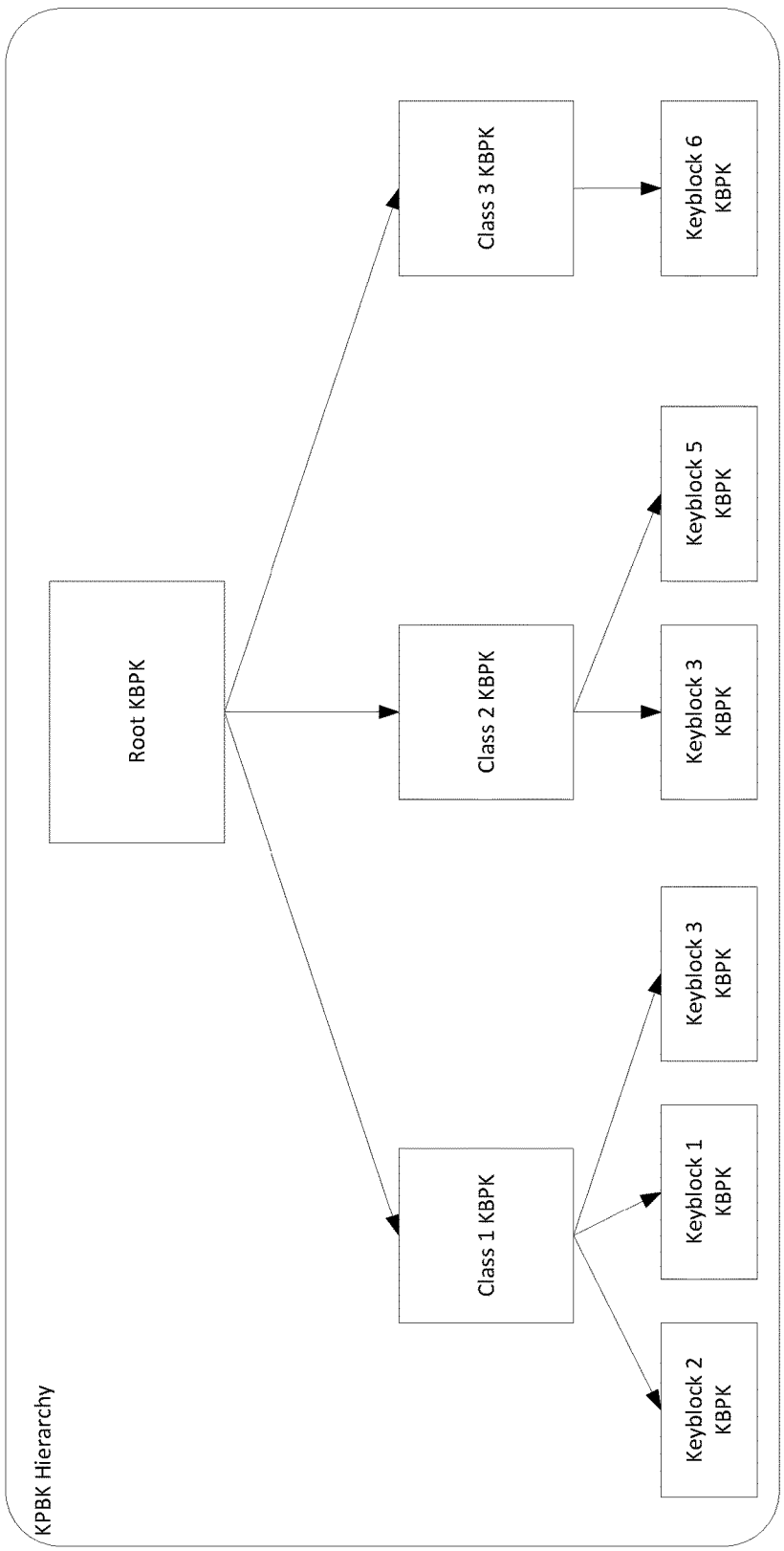
FIG. 3 depicts an exemplary KBPK hierarchy according to one embodiment.

An exemplary KBPK hierarchy is provided in FIG. 3.

Referring again to FIG. 1, in one embodiment, untrusted key manger 120 may interface with key loader 130. Key-loader 130 may interface with trusted key manager 140.

Persistent storage 150 may store the root KBPK. Additional KBPKs in the hierarchy may be stored in persistent storage 160 as is necessary and/or desired.

The trusted domain may include one or more engines 150. Each engine 150 may include hardware and software to implement a cryptographic algorithm, such as DES, APS, etc. Keys are an input to engine 150, and the output may be an encryption or decryption of the transaction.

Figure 4:
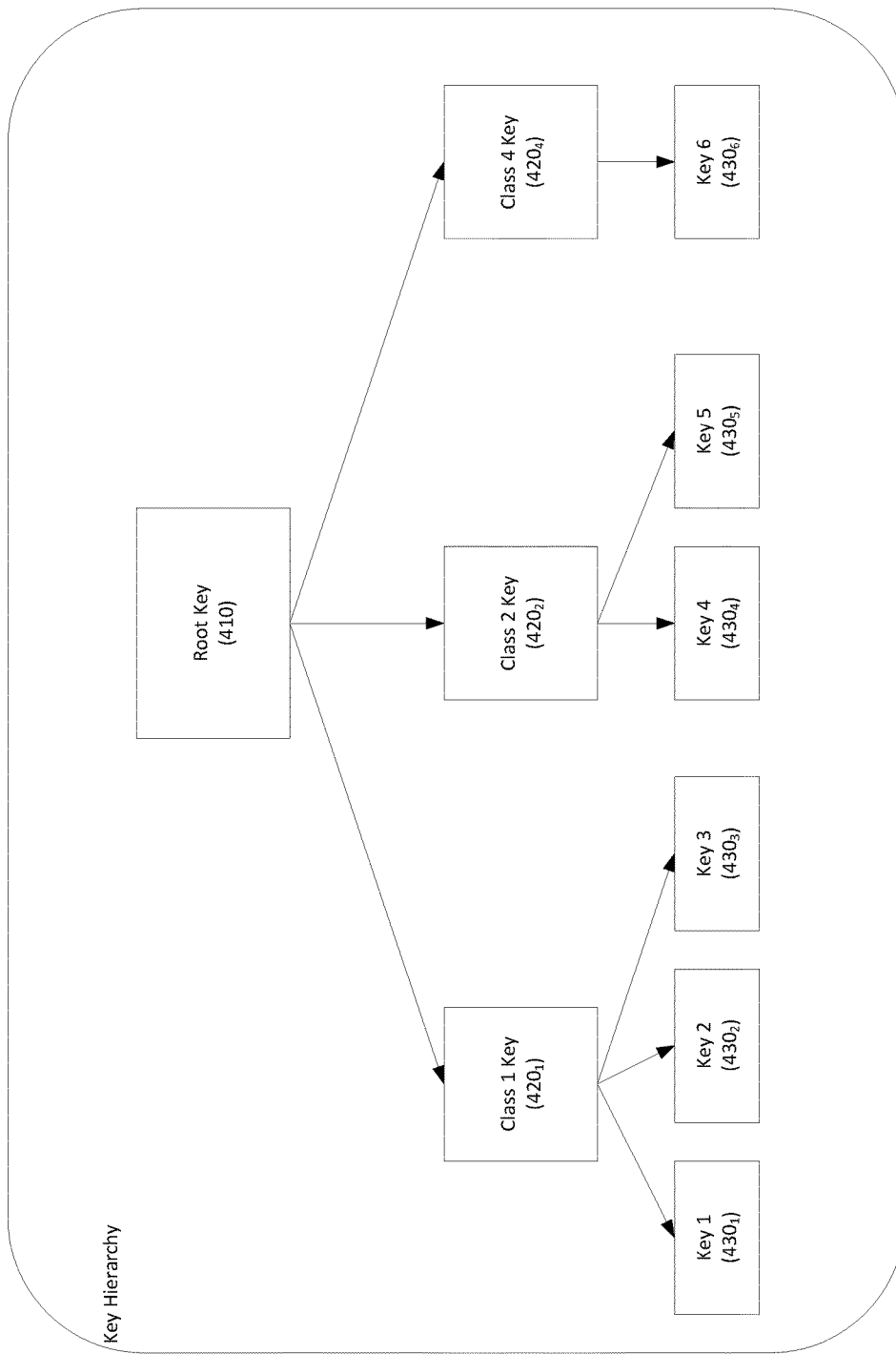
FIG. 4 depicts an exemplary key hierarchy according to one embodiment.

Referring to FIG. 4, a key hierarchy is disclosed according to one embodiment. Key hierarchy 400 may include root key 410 which may have a plurality of class keys class 1 key $420_1$, class 2 key $420_2$, class 3 key $420_3$, ... class n key $420_n$. Each class key 420 may have one or more keys $430_1$, $430_2$, $430_3$, $430_4$, $430_5$, $430_6$, ... $430_n$.

In one embodiment, the hierarchy of keys may be based on the class or type of key, and may be optimized based on key usage. For example, there may be a limited number of keys under each key.

Although three levels of keys are illustrated, it should be recognized that a larger number of levels, or a smaller number of levels, may be used as is necessary and/or desired. Similarly, the number of classes of keys may be greater or fewer as is necessary and/or desired.

In FIG. 4, three classes of keys are illustrated. The end keys—the key at the end or bottom of the tree such as keys 330—are used to protect data. The other keys—keys 310 and 320—are used to protect keys 330.

The hierarchy disclosed in FIG. 4 may support a plurality of operations, such as encryption and decryption of data given a RootKey; MAC generation and/or verification of each parent key given a RootKey; MAC generation/verification of all data given a RootKey, etc.

A similar key hierarchy can exist for Integrity/Authenticity, such as for MACing.

Figure 5:
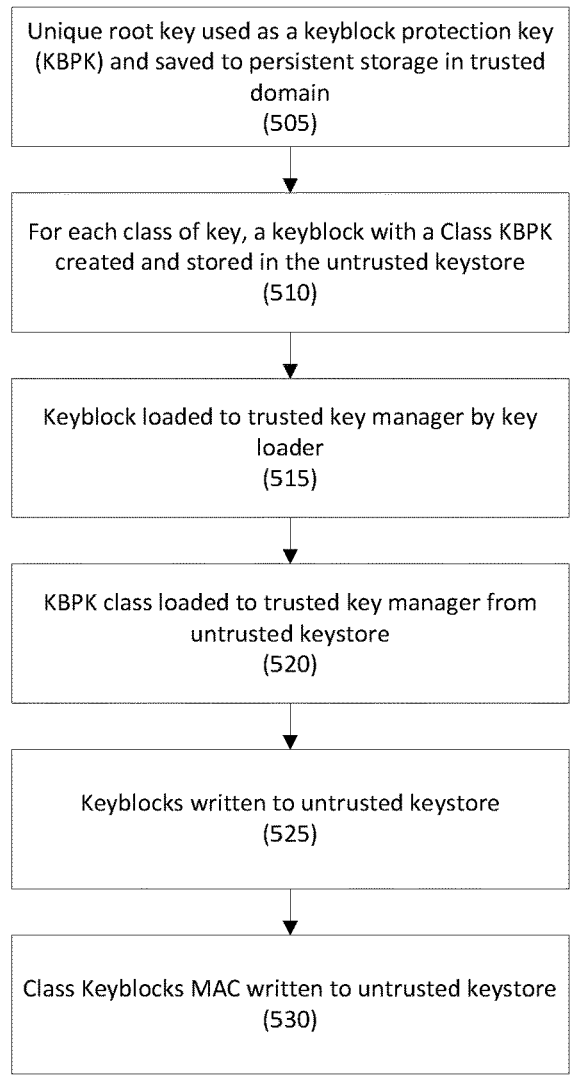
FIG. 5 depicts an exemplary method for startup and key writing according to one embodiment.

Referring to FIG. 5, a method depicting a process of startup and key writing is provided according to one embodiment. In the startup process, in step 505, a unique root key may be selected as a root KBPK. In one embodiment, the unique root key may be pre-programmed such a on a system on a chip. Other sources of the unique root key may be used as is necessary and/or desired.

In one embodiment, the root KBPK may be saved to persistent storage in a trusted domain.

In step 510, for each class of key, a keyBlock with a Class KBPK may be created and stored in an untrusted keystore. In one embodiment, the trusted key manager may create a keyblock for each class using the Root KBPK. It may then store the keyblocks for each class in the untrusted keystore.

The process may be repeated for each class of key.

Next, the keys are written. In the writing process, in step 515, the keyblocks may be loaded to the trusted key manager in the trusted domain by the untrusted key loader. In one embodiment, the keyblock may be decrypted and verified. For example, all keyblocks under the MAC class key may be decrypted and verified.

In step 520, class keyblocks may be loaded to the trusted key manager from the untrusted keystore. In one embodiment, the trusted key manager may use the root KBPK to authorize and decrypt the class keyblocks with the root KBPK to get the class KBPK for the class and the keyblockheader.

In step 525, keyblocks may be written to the untrusted keystore. For example, the trusted key manager may create a keyblock with a key, keyblockheader payload, and keyblock KBPK as the KBPK. The keyblock may then be written to the untrusted key store.

The process may be repeated for each keyblock.

In step 530, class Keyblocks MACS may be written to the untrusted keystore. In one embodiment, a MAC may be created for all keyblocks in a given keyblock class, and may be written to the untrusted keystore.

For example, all the keyblocks under the MAC class key (not just an individual key) may be verified. Thus, there is verification that no keys have been removed or added.

A result of the generation of the MACs is a MAC hierarchy tree.

Figure 6:
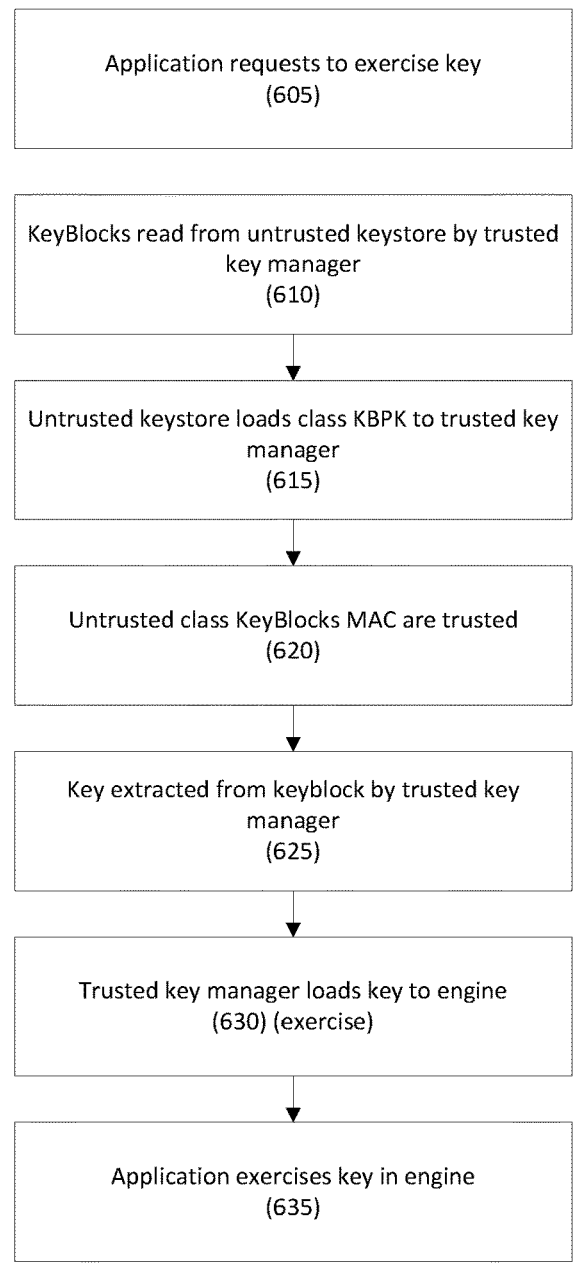
FIG. 6 depicts an exemplary method for key reading and key exercise according to one embodiment

Referring to FIG. 6, a method depicting a process of key reading and key exercise is provided according to one embodiment.

In the key reading process, in step 605, an application may request to exercise a key. For example, an application may need to perform an operation that exercises a key, such as PIN encryption, message authentication, etc. In one embodiment, the application may call an API that issues a request to the trusted key manager to exercise the key.

In step 610, a keyblock may be read from the untrusted keystore by trusted key manager. In order to retrieve the key for a given keyblock, all keyblocks below the corresponding keyblock must be decrypted and verified. Thus, to verify the keystore, all keyblocks under the MAC class key must be decrypted and verified.

In step 615, the untrusted keystore may load a class KBPK MACs to the trusted key manager. The class KBPK MAC is verified from multiple keys to ensure none are missing. This is different from the MAC of an individual key.

In step 620, the untrusted class KeyBlocks MAC read may be trusted.

In step 625, the key may be extracted from the keyblock by the trusted key manager.

In the key exercise process, in step 630, the trusted key manager may load the key to the engine. For example, the trusted key manager may perform various checks to ensure that the application is authorized to exercise the key.

The trusted key manager may load the key to the engine (the block using the key, with an input such as PIN data, to provide a cryptographic output) for that application.

In step 635, the key may be exercised in the engine. For example, the application may call an API that causes input data to be provided to the engine, and the cryptographic operation to be performed with the engine. The application will receive the output, e.g., the encrypted PIN.

It will be appreciated by persons skilled in the art that the present invention is not limited by what has been particularly shown and described hereinabove. Rather the scope of the present invention includes both combinations and sub-combinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for providing a trusted keystore, comprising:
in an information processing apparatus comprising at least one computer processor:
selecting and storing a root Keyblock Protection Key (KBPK) in a trusted domain;
for each key class:
creating a keyblock with a class KBPK; and
storing the keyblock in an untrusted keystore in an untrusted domain;
loading keyblocks to a trusted key manager in the trusted domain;
decrypting the keyblocks with an encryption class key;
verifying the keyblocks under a MAC class key;
loading class keyblocks to the trusted key manager from the untrusted keystore;
writing the keyblocks to the untrusted keystore; and
writing class keyblock MACs in a hierarchy to the untrusted keystore;
wherein a number of levels in the hierarchy is based on an amount of available storage in the trusted domain.

2. The method of claim 1, wherein the root KBPK is pre-programed.

3. The method of claim 1, wherein the keyblock is created using the root KBPK.

4. The method of claim 1, wherein the step of loading class keyblocks to the trusted key manager from the untrusted keystore comprises authorizing and decrypting the class keyblocks with the root KBPK to get a class KBPK and a keyblockheader.

5. The method of claim 1, wherein the step of writing the keyblocks to the untrusted keystore comprises creating the keyblock with a key, a keyblockheader payload, and a keyblock KBPK.

6. The method of claim 1, wherein the step of hierarchically writing class keyblock MACs to the untrusted keystore comprises creating a MAC for all keyblocks in a keyblock class.

7. The method of claim 6, further comprising verifying all the keyblocks under the MAC class key after hierarchically writing class keyblock MACs to the untrusted keystore.

8. A method for exercising a key in a trusted keystore, comprising:
in a trusted key manager comprising at least one computer processor:

receiving a request from an application to exercise a key in an untrusted keystore;

reading a keyblock including the key from the untrusted keystore;

decrypting and verifying keyblocks in a hierarchy that are below the read keyblock;

loading a class Keyblock Protection Key (KBPK) MAC;

verifying the class KBPK MAC;

trusting the class KeyBlocks MAC;

extracting the key from the keyblock; and loading the key to an engine;

wherein the engine exercises the key.

9. The method of claim 8, wherein the exercise comprises at least one of PIN encryption using the key and message authentication using the key.

10. The method of claim 8, further comprising:

verifying that the application is authorized to exercise the key.

11. The method of claim 8, wherein the engine performs a cryptographic operation with the key.

12. A trusted keystore system having at least one hardware computer processor, comprising:

an untrusted domain comprising an untrusted keystore and an untrusted key manager;

a trusted domain comprising a trusted key manager and an engine; and persistent storage;

wherein:

the trusted key manager selects and stores a root Keyblock Protection Key (KBPK) in the trusted domain;

for each key class, the trusted key manager creates a keyblock with a class KBPK and stores the keyblock in the untrusted keystore;

the untrusted key manager loads keyblocks to the trusted key manager in the trusted domain;

the trusted key manager decrypts and verifies keyblocks under a MAC class key;

the untrusted key manager loads class keyblocks to the trusted key manager from the untrusted keystore;

the trusted key manager writes the keyblocks to the untrusted keystore via the untrusted key manager; and the trusted key manager writes class keyblock MACs in a hierarchy to the untrusted keystore via the untrusted key manager;

wherein a number of levels in the hierarchy is based on an amount of available storage in the trusted domain.

13. The system of claim 12, wherein the root KBPK is pre-programed in a system-on-a-chip.

14. The system of claim 12, wherein the keyblock is created using the root KBPK.

15. The system of claim 12, wherein the trusted key manager authorizes and decrypts the class keyblocks with the root KBPK to get a class KBPK and a keyblockheader.

16. The system of claim 12, wherein the keyblock is created with a key, a keyblockheader payload, and a keyblock KBPK.

17. The system of claim 12, wherein the untrusted keystore creates a MAC for all keyblocks in a keyblock class.

18. The system of claim 12, wherein:

the trusted key manager receives a request from an application to exercise a key in the untrusted keystore;

the trusted key manager reads a keyblock including the key from the untrusted keystore via the untrusted key manager;

the trusted key manager decrypts and verifies keyblocks in the hierarchy that are below the read keyblock;

the trusted key manager loads a class Keyblock Protection Key (KBPK) MAC;

the trusted key manager verifies the class KBPK MAC;

the trusted key manager extracts the key from the keyblock; and the trusted key manager loads the key to the engine;

wherein the engine exercises the key.

19. The system of claim 18, wherein the exercise comprises at least one of PIN encryption using the key and message authentication using the key.

20. The system of claim 18, wherein the engine performs a cryptographic operation with the key.

\* \* \* \* \*